United States Patent
Ogle et al.

(10) Patent No.: US 11,197,053 B2
(45) Date of Patent: *Dec. 7, 2021

(54) SET-TOP BOX WITH ENHANCED CONTENT AND SYSTEM AND METHOD FOR USE OF SAME

(71) Applicant: Enseo, Inc., Plano, TX (US)

(72) Inventors: Vanessa Ogle, Fairview, TX (US); William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,089

(22) Filed: Nov. 24, 2020

(65) Prior Publication Data

US 2021/0084356 A1  Mar. 18, 2021

Related U.S. Application Data

(63) Continuation of application No. 16/358,464, filed on Mar. 19, 2019, now Pat. No. 10,848,814, which is a continuation-in-part of application No. 16/351,893, filed on Mar. 13, 2019, now Pat. No. 10,602,197, which is a continuation of application No.
(Continued)

(51) Int. Cl.
| | |
|---|---|
| *H04N 21/41* | (2011.01) |
| *H04N 21/47* | (2011.01) |
| *H04N 21/45* | (2011.01) |
| *H04N 21/436* | (2011.01) |
| *H04N 21/4363* | (2011.01) |
| *H04N 21/422* | (2011.01) |

(52) U.S. Cl.
CPC ... *H04N 21/4126* (2013.01); *H04N 21/42204* (2013.01); *H04N 21/436* (2013.01); *H04N 21/43615* (2013.01); *H04N 21/43632* (2013.01); *H04N 21/43635* (2013.01); *H04N 21/43637* (2013.01); *H04N 21/4516* (2013.01); *H04N 21/4524* (2013.01); *H04N 21/47* (2013.01)

(58) Field of Classification Search
CPC ......... H04N 21/4126; H04N 21/42204; H04N 21/436; H04N 21/43615; H04N 21/43632; H04N 21/43635
See application file for complete search history.

(56) References Cited

U.S. PATENT DOCUMENTS

| | | |
|---|---|---|
| 5,661,517 A | 8/1997 | Budow et al. |
| 9,088,828 B2 * | 7/2015 | Ogle ................... H04N 21/262 |

(Continued)

*Primary Examiner* — Sumaiya A Chowdhury
(74) *Attorney, Agent, or Firm* — Scott Griggs; Griggs Bergen LLP

(57) ABSTRACT

A set-top box with enhanced content and system and method for use of the same are disclosed. In one embodiment of the set-top box, a wireless transceiver is located within a housing, which also interconnectively includes a television input, a television output, a processor, and memory. The set-top box provides a fully tuned signal including general content via the television output to a display or a television, for example. The set-top box may also identify a proximate wireless-enabled interactive programmable device and responsive to identifying the proximate wireless-enabled interactive device, forward a fully tuned signal including custom content relative to a group identification associated with the proximate wireless-enabled interactive programmable device.

19 Claims, 5 Drawing Sheets

Related U.S. Application Data

16/181,470, filed on Nov. 6, 2018, now Pat. No. 10,547,875, and a continuation of application No. 15/884,895, filed on Jan. 31, 2018, now abandoned, which is a continuation of application No. 15/824,766, filed on Nov. 28, 2017, now Pat. No. 10,123,056, which is a continuation of application No. 15/417,554, filed on Jan. 27, 2017, now Pat. No. 9,832,489, which is a continuation of application No. 15/074,067, filed on Mar. 18, 2016, now Pat. No. 9,560,388, which is a continuation of application No. 14/803,428, filed on Jul. 20, 2015, now Pat. No. 9,326,009, which is a continuation of application No. 14/294,123, filed on Jun. 2, 2014, now Pat. No. 9,088,828.

(60) Provisional application No. 62/453,305, filed on Feb. 1, 2017, provisional application No. 61/829,932, filed on May 31, 2013.

(56) References Cited

U.S. PATENT DOCUMENTS

| | | |
|---|---|---|
| 9,326,009 B2 | 4/2016 | Ogle et al. |
| 9,560,388 B2 | 1/2017 | Ogle et al. |
| 9,832,489 B2 | 11/2017 | Ogle et al. |
| 10,123,056 B2 | 11/2018 | Ogle et al. |
| 2004/0019513 A1 | 1/2004 | Colalancia |
| 2007/0050197 A1 | 3/2007 | Efron |
| 2008/0319807 A1 | 12/2008 | Weiss |
| 2010/0211489 A1 | 8/2010 | Zhang |
| 2010/0250707 A1 | 9/2010 | Dalley |
| 2017/0046650 A1 | 2/2017 | Mulji |
| 2017/0142449 A1 | 5/2017 | Ogle et al. |
| 2017/0289596 A1* | 10/2017 | Krasadakis ........... H04W 4/029 |

* cited by examiner

SET-TOP BOX WITH ENHANCED CONTENT AND SYSTEM AND METHOD FOR USE OF SAME

PRIORITY STATEMENT & CROSS-REFERENCE TO RELATED APPLICATIONS

This application is a continuation of U.S. patent application Ser. No. 16/358,464 entitled "Set-Top Box with Enhanced Content and System and Method for Use of Same" filed on Mar. 19, 2019, in the names of Vanessa Ogle, et al.; now U.S. Pat. No. 10,848,814 issued on Nov. 24, 2020; which is a continuation of U.S. patent application Ser. No. 15/884,895 entitled "Set-Top Box with Enhanced Content and System and Method for Use of Same" filed on Jan. 31, 2018, in the names of Vanessa Ogle et al.; which claims priority from U.S. patent application Ser. No. 62/453,305, entitled "Set-Top Box with Enhanced Content and System and Method for Use of Same" filed on Feb. 1, 2017, in the names of Vanessa Ogle et al.; all of which are hereby incorporated by reference for all purposes. Application Ser. No. 16/358,464 is also a continuation-in-part of co-pending U.S. patent application Ser. No. 16/351,893 entitled "Set-Top Box with Interactive Portal and System and Method for Use of Same" filed on Mar. 13, 2019, in the names of Vanessa Ogle et al.; which is a continuation of U.S. patent application Ser. No. 16/181,470 entitled "Set-Top Box with Interactive Portal and System and Method for Use of Same" filed on Nov. 6, 2018, in the names of Vanessa Ogle et al.; which is a continuation of U.S. patent application Ser. No. 15/824,766 entitled "Set-Top Box with Interactive Portal and System and Method for Use of Same" filed on Nov. 28, 2017, in the names of Vanessa Ogle et al., now U.S. Pat. No. 10,123,056 issued on Nov. 6, 2018; which is a continuation of U.S. patent application Ser. No. 15/417,554 entitled "Set-Top Box with Interactive Portal and System and Method for Use of Same" filed on Jan. 27, 2017, in the names of Vanessa Ogle et al., now U.S. Pat. No. 9,832,489 issued on Nov. 28, 2017; which is a continuation of U.S. patent application Ser. No. 15/074,067 entitled "Set-Top Box with Interactive Portal and System and Method for Use of Same" filed on Mar. 18, 2016, in the names of Vanessa Ogle et al., now U.S. Pat. No. 9,560,388 issued on Jan. 31, 2017; which is a continuation of U.S. patent application Ser. No. 14/803,428 entitled "Set-Top Box with Interactive Portal and System and Method for Use of Same" filed on Jul. 20, 2015, in the names of Vanessa Ogle et al., now U.S. Pat. No. 9,326,009 issued on Apr. 26, 2016; which is a continuation of U.S. patent application Ser. No. 14/294,123 entitled "Set-top Box with Interactive Portal and System and Method for Use of Same" filed on Jun. 2, 2014, in the names of Vanessa Ogle et al., now U.S. Pat. No. 9,088,828 issued on Jul. 21, 2015; which claims priority from U.S. patent application Ser. No. 61/829,932 entitled "On-Screen Display" filed on May 31, 2013 in the name of Vanessa Ogle; all of which are hereby incorporated by reference for all purposes.

TECHNICAL FIELD OF THE INVENTION

This invention relates, in general, to set-top boxes and, in particular, to set-top boxes with enhanced content and systems and methods for use of the same that address and enhance the content provided to a display or television, for example.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining the experience of guests staying in hospitality lodging establishments. Accordingly, there is a need for improved systems and methods for providing enhanced content in an easy-to-use platform in the hospitality lodging industry.

SUMMARY OF THE INVENTION

It would be advantageous to achieve a set-top box that would improve upon existing limitations in functionality. It would also be desirable to enable a computer-based electronics and software solution that would provide enhanced content in an easy-to-use platform in the hospitality lodging industry or in another environment. To better address one or more of these concerns, a set-top box with enhanced content and system and method for use of the same are disclosed. In one embodiment of the set-top box, a wireless transceiver is located within a housing, which also interconnectively includes a television input, a television output, a processor, and memory.

The set-top box provides a fully tuned signal including general content via the television output to a display or a television, for example. The set-top box may also identify a proximate wireless-enabled interactive device and responsive to identifying the proximate wireless-enabled interactive device, forward a fully tuned signal including custom content relative to a group identification associated with the proximate wireless-enabled interactive device. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
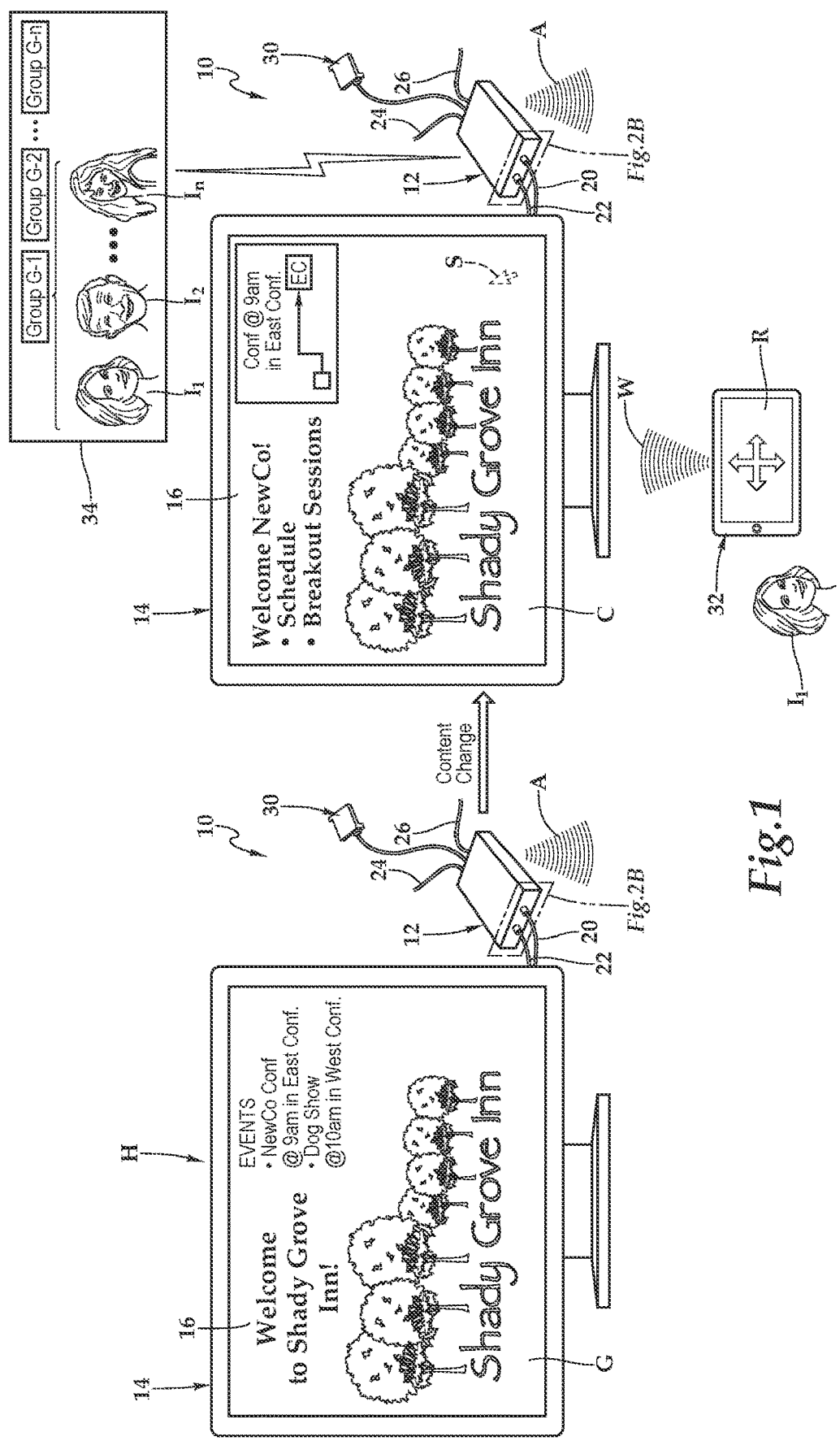
FIG. 1 is a schematic diagram depicting one embodiment of a system for providing a set-top box having enhanced content thereon according to the teachings presented herein.

Referring initially to FIG. 1, therein is depicted one embodiment of a system 10 utilizing set-top box 12 with enhanced content capabilities being employed within a hospitality lodging establishment. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as a hotel H having various rooms and spaces, which may be common spaces. The set-top box 12 is communicatively disposed with various amenities associated with the hospitality environment, including a display 14. Set-top boxes, like the set-top box 12, may be deployed throughout the rooms and spaces of the hotel H.

As shown, in one embodiment, within a space, such as a lobby, elevator foyer, or other common space, for example, the system 10 includes the set-top box 12 and the display 14, which is illustrated as a television having a screen 16. It should be appreciated however, that the display 14 may also be any electronic visual display device, for example. A connection, which is depicted as an HDMI connection 20, connects the set-top box 12 to the display 14. Other connections include a power cable 22 coupling the set-top box 12 to a power source, a coaxial cable 24 coupling the set-top box 12 to an external cable source, and a category five (Cat 5) cable 26 coupling the set-top box 12 to an external pay-per-view source at a hotel or other lodging establishment, for example. As shown, the set-top box 12 may include a dongle 30 providing particular technology and functionality extensions thereto. That is, the set-top box 12 may be set-top box-dongle combination in one embodiment. More generally, it should be appreciated that the cabling connected to the set-top box 12 will depend on the environment and application, and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the display 14.

A proximate wireless-enabled interactive programmable device 32 may be a device, including handheld devices, that may be supplied or carried by the guest and may be selected from a range of existing devices, such as, for example iPads®, iPhones®, iPod Touch®, Android® devices, Blackberry® devices, personal computers, laptops, tablet computers, smart phones, and smart watches, for example. As will be discussed in further detail below, in one implementation, advertising broadcast data originating from the set-top box 12 or the proximate wireless-enabled interactive programmable device 32 may be utilized to identify the proximate wireless-enabled interactive programmable device 32. Further, as will also be discussed in further detail hereinbelow, in another implementation, an application installed from a server enables the set-top box 12 and the proximate wireless-enabled interactive programmable device 32 to be wirelessly paired. In another embodiment, a challenge-response is utilized to wirelessly pair the set-top box 12 and the proximate wireless-enabled interactive programmable device 32.

As shown, an interactive general portal G is displayed on the display 16, which is generic, and displays a general welcome and general information about conferences and events occurring at the hospitality lodging establishment. In one implementation, as illustrated, the set-top box 12 extends a physical authorization interface, shown as area A, from the set-top box to an area easily accessible to a transitory guest's convenience such as in front or side of the display 14. As will be discussed in more detail hereinbelow, this physical authorization interface A may include a short range wireless data connection that is enabled only when very close physically to the proximate wireless-enabled interactive programmable device 32, for example.

In one implementation, a search operation is utilized to identify the proximate wireless-enabled interactive programmable device 32. Responsive to identifying the proximate wireless-enabled interactive programmable device 32, a fully tuned signal is forwarded from the set-top box 12 to the display 16 which includes custom content C. The custom content C is relative to a group identification 34 associated with the proximate wireless-enabled interactive programmable device 32.

In one embodiment, the general content G and the custom content C relate to the hospitality establishment and the group identification 34 relates to a hospitality aspect such as group travel relative to the hospitality establishment, group meeting accommodations relative to the hospitality establishment, group event accommodations relative to the hospitality establishment, and the like.

In the illustrated embodiment, the display 14 is located in a common area within the hospitality establishment and guest $I_1$ is carrying the proximate wireless-enabled interactive programmable device 32 within the common area. The guest $I_1$ and the proximate wireless-enabled interactive programmable device 32 enter the physical authorization interface, shown as the area A. Perhaps, the guest $I_1$ is walking through the common area or perhaps the guest $I_1$ is stopping at the display 14 for additional information about conferences or events, for example, within the hospitality establishment. Via the proximate wireless-enabled interactive programmable device 32 wireless transmissions W and an advertising broadcast data standard, the proximate wireless-enabled interactive programmable device 32 is identified as being associated with the guest $I_1$. The group identification 34 is located within the set-top box 12 or, alternatively, the group identification 34 is accessible by the set-top box 12 at a server (e.g., a server 40 in FIGS. 2A and 2B).

The guest individual $I_1$ is part of Group G-1, as opposed to Groups G-2 though G-n. As shown, Group G-1 includes multiple individuals such as individual $I_1$ and individual $I_2$ through individual $I_n$. These individuals, individual $I_1$ and individual I₂ through individual Iₙ, have a common hospitality aspect such as group travel relative to the hospitality establishment, group meeting accommodations relative to the hospitality establishment, or group event accommodations relative to the hospitality establishment, for example. Based on the common hospitality aspect, the custom content C is provided to the display 14 from the set-top box 12. In the instant example in FIG. 1, the individuals, including individual I₁, of Group G-1 are all part of a group called NewCo and are attending a conference and have a specific schedule with breakout sessions. The events are occurring in the east conference room at 9 am as shown in the custom content C. As previously mentioned, with respect to the custom content C, the group identification 34 is located within the set-top box 12 or, alternatively, the group identification 34 is accessible by the set-top box 12 at a server (e.g., a server 40 in FIGS. 2A and 2B). Further, individuals may be associated with particular groups at the time of room reservation, event reservation, room check-in or event check-in, for example with an individual's proximate wireless-enabled programmable device being associated with the individual at the same time, for example.

Further, following the identification, in one embodiment, a pairing may be established between the set-top box 12 and the proximate wireless-enabled interactive device 32, and once the pairing is established, the set-top box 12 provides a secure wireless interface to communicate transitory guest user device authorization information to the set-top box 12 to accomplish verification. Once authorization information is communicated to the set-top box 12, the set-top box 12 enables virtual remote control functionality.

In operation, virtual remote control functionality may be provided by the proximate wireless-enabled interactive programmable device 32 by actuation of virtual buttons, for example, to send a command signal to the television, to import content from the proximate wireless-enabled interactive programmable device to the television, or control the custom content C on the display 16. As shown in FIG. 1, by way of example, guest I₁ provides input via the remote R, which is received by the proximate wireless-enabled interactive programmable device 32 and translated into a command to move the cursor S and click on "Breakout Sessions" to obtain additional information.

Figure 2A:
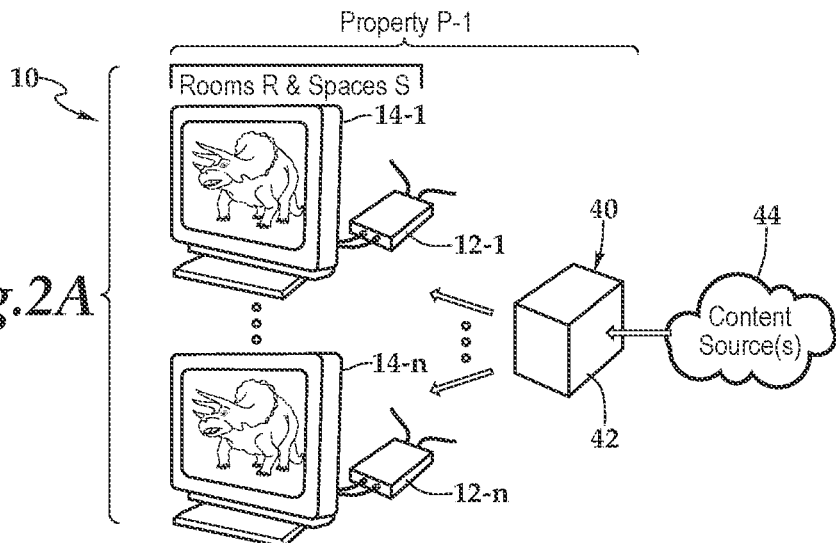
FIG. 2A is a schematic diagram depicting one embodiment of the system of FIG. 1 within an on-property deployment.

It should be appreciated that the server 40 may be located on a single property to serve one or more televisions thereon. Further, it should be appreciated that the server 40 may be remotely located to serve multiple properties having multiple televisions. Referring now to FIG. 2A, the system 10 may be deployed such that the server 40 is co-located on the property P-1 with the displays 14-1 . . . 14-n and the corresponding set-top boxes 12-1 . . . 12-n, with, in one embodiment, content sources 44 configured to provide sources of content. As shown, the server 40 includes a housing 42 having a television output and other components therein. As previously alluded, the server 40 may store the group identification 34 for access by the set-top box 12 or, alternatively, for downloading prior to use by the set-top box 12.

Figure 2B:
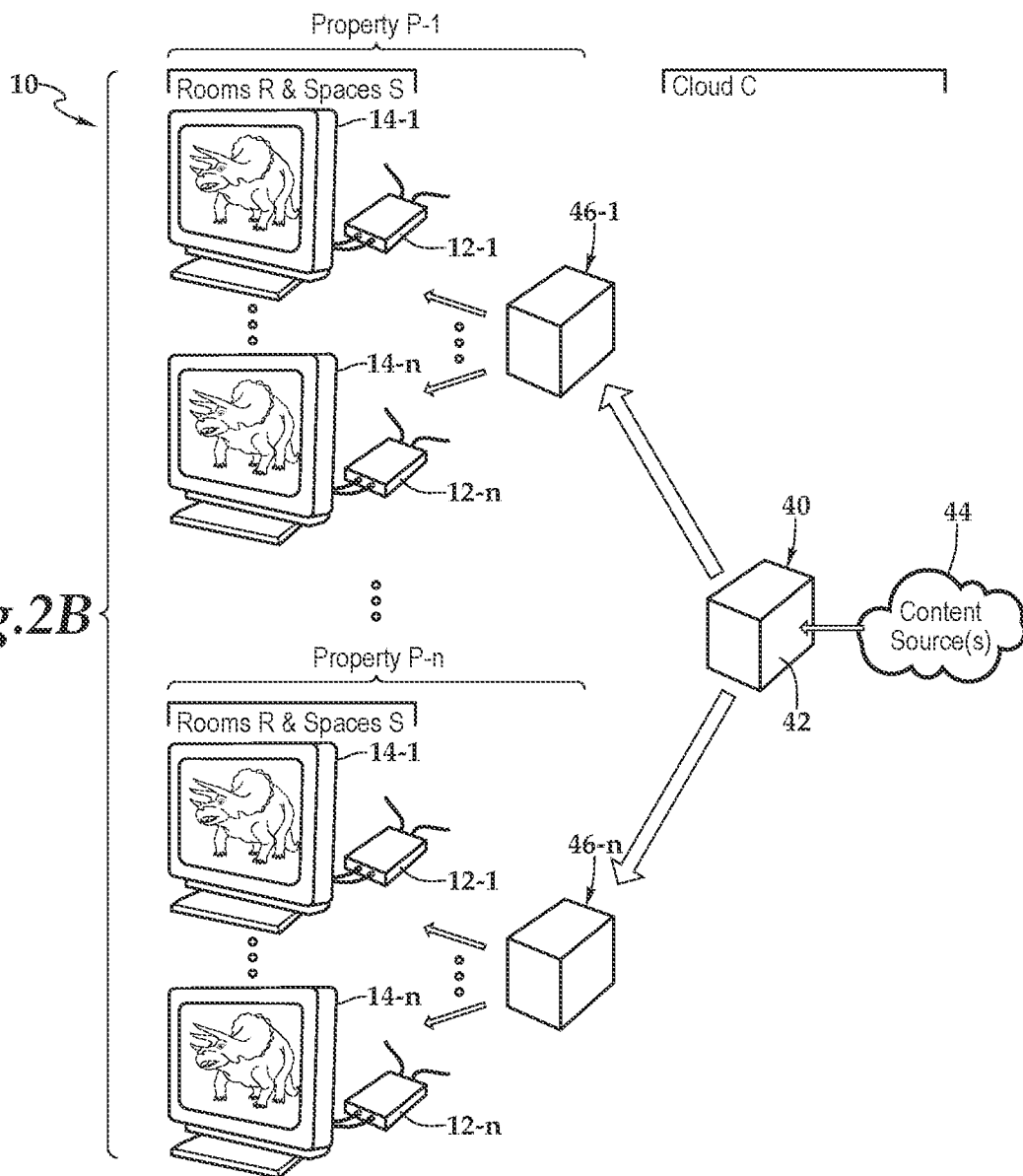
FIG. 2B is a schematic diagram depicting one embodiment of the system of FIG. 1 within a cloud-computing deployment.
Figure 3A:
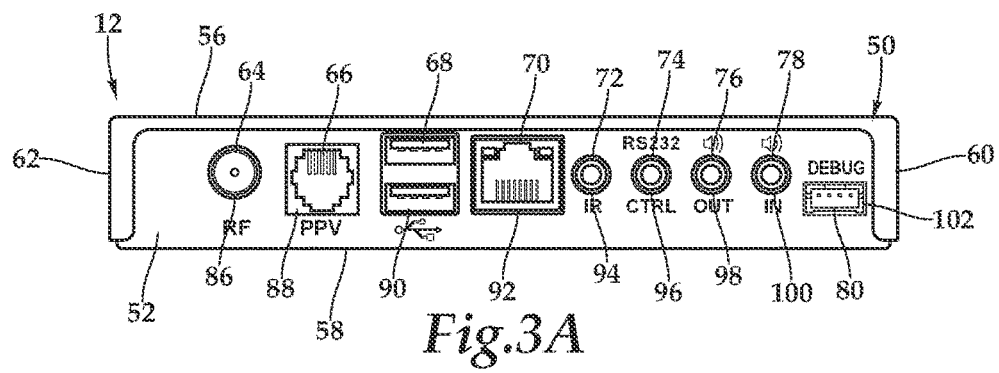
FIG. 3A is a wall-facing exterior elevation view of one embodiment of the set-top box depicted in FIG. 1 in further detail.
Figure 3B:
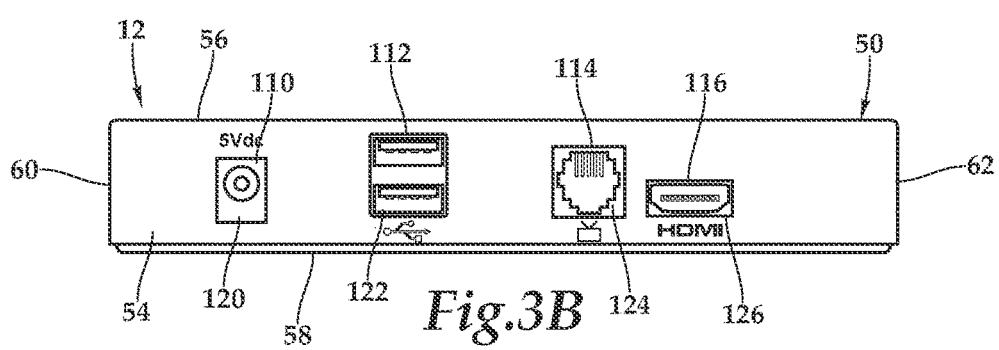
FIG. 3B is a television-facing exterior elevation view of the set-top box depicted in FIG. 1.
Figure 3C:
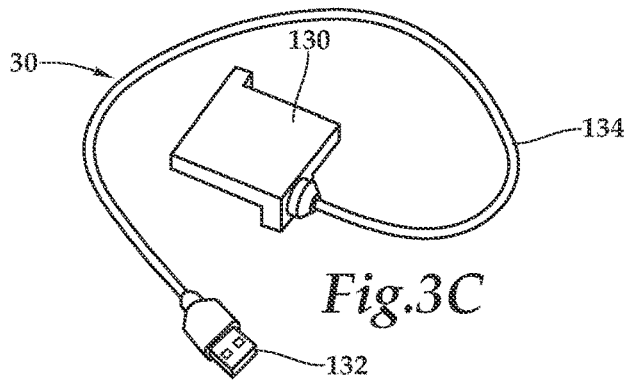
FIG. 3C is a front perspective view of a dongle depicted in FIG. 1 in further detail.
Figure 4:
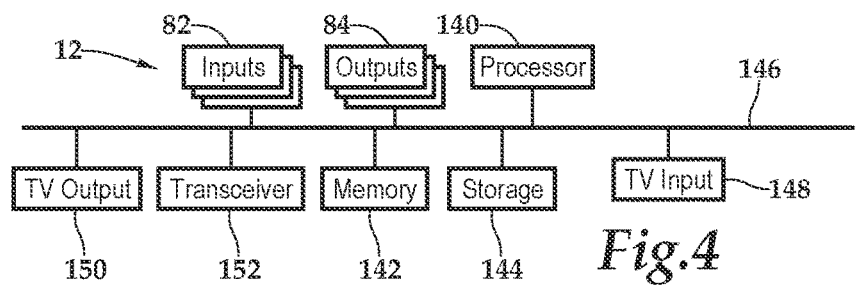
FIG. 4 is a functional block diagram depicting one embodiment of the set-top box presented in FIGS. 3A and 3B.

Referring to FIG. 2B, the system 10 may be deployed such that the server 40 is located remotely within cloud C relative to displays 14-1 . . . 14-n, which are located at properties P-1 through P-n. In particular, the sever 40, which receives content from content sources 44, may be located remotely relative to the displays 14-1 . . . 14-n and any set-top boxes 12-1 . . . 12-n such that a property headend 46-1 . . . 46-n is interposed between the server 40 and the displays 14-1 . . . 14-n. As shown, in this implementation, the property headend 46-1 . . . 46-n is co-located with the televisions 14-1 . . . 14-n at a respective property, P-1 through P-n. As previously alluded, the server 40 may store the group identification 34 for access by the set-top box 12 or, alternatively, for downloading prior to use by the set-top box 12.

Referring to FIG. 3A, FIG. 3B, FIG. 3C, and FIG. 4, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, a RJ-45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-45 coupling 124, and an HDMI port 126. It should be appreciated that the configuration of ports may vary with the set-top box depending on application and context. As previously alluded to, the housing 50 may include a housing-dongle combination including, with respect to the dongle 30, a unit 130 having a cable 134 with a set-top box connector 132 for selectively coupling with the set-top box 12.

Within the housing 50, a processor 140, memory 142, storage 144, the inputs 82, and the outputs 84 are interconnected by a bus architecture 146 within a mounting architecture. It should be understood that the processor 140, memory 142, storage 144, the inputs 82, and the outputs 84 may be entirely contained within the housing 50 or the housing-dongle combination. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A television content signal input 148 and a television output 150 are also secured in the housing 50 in order to receive content from a source in the hospitality property and forward the content, including external content such as cable and satellite and pay-per-view (PPV) programing, to the television located within the hotel room.

A transceiver 152 is associated with the set-top box 12 and communicatively disposed with the bus 146. As shown the transceiver 152 may be internal, external, or a combination thereof to the housing. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, WiFi, ZigBee, near field communications (NFC), Bluetooth low energy and Bluetooth, for example. Also, infrared (IR) may be utilized.

The memory 142 and storage 144 are accessible to the processor 140 and include processor-executable instructions that, when executed, cause the processor 140 to execute a series of operations. The processor-executable instructions forward the fully tuned signal to the display and, as mentioned, the fully tuned signal including general content. The processor-executable instructions also specify a search operation to identify the proximate wireless-enabled interactive device by receiving advertising broadcast data from the proximate wireless-enabled interactive programmable device via the wireless transceiver using, for example, a Bluetooth low energy standard, wherein the search operation utilizes the wireless transceiver to wirelessly identify the proximate wireless-enabled interactive programmable device. Alternatively, the processor-executable instructions, when executed, cause the processor to specify a search operation to identify the proximate wireless-enabled interactive device by transmitting advertising broadcast data via the wireless transceiver using, for example, a Bluetooth low energy standard, wherein the search operation utilizes the wireless transceiver to wirelessly identify the proximate wireless-enabled interactive programmable device. Responsive to identifying the proximate wireless-enabled interactive device, the processor-executable instructions cause the processor to forward the fully tuned signal to the display and, in this instance, the fully tuned signal includes custom content relative to a group identification associated with the proximate wireless-enabled interactive device.

In another embodiment, the processor-executable instructions specify a search operation to identify the proximate wireless-enabled interactive programmable device, 32 wherein the search operation utilizes the wireless transceiver to wirelessly identify the proximate wireless-enabled interactive programmable device 32. The processor-executable instructions then establish a pairing between the proximate wireless-enabled interactive programmable device 32 and the set-top box 12. Following the establishment of a pairing, formatted parallel audiovisual experience instructions are sent to the proximate wireless-enabled interactive programmable device 32. The formatted parallel audiovisual experience instructions are configured to provide a downstream parallel experience related to the content on the display 14. The memory 142 also provides instructions to the processor for virtual buttons on a touch screen display associated with the proximate wireless-enabled interactive programmable device 32. The virtual buttons are associated with the proximate wireless-enabled interactive programmable device 32.

With respect to controlling the display 14, the processor-executable instructions cause the processor to receive and process virtual remote control functionality input instructions from the proximate wireless-enabled interactive programmable device 32. The virtual remote control functionality input instructions being representations of a spoken sequence of words. The processor 140 is then caused to evaluate the spoken sequence of words to assign a meaning to the spoken sequence of words and then generate a command signal, which is sent to the television. The formatted parallel audiovisual experience instructions include instructions that prompt the spoken sequence of words as a response.

With respect to importing content from the proximate wireless-enabled interactive programmable device 32, the memory 142 includes processor-executable instructions that, when executed cause the processor 140 to be responsive to evaluating the spoken sequence of words, import content from the proximate wireless-enabled interactive programmable device 32 and reformat the imported content such that the television output forwards a fully tuned signal including the imported content to the display 14. The fully tuned signal includes the imported content provides an upstream parallel experience on the display 14 related to the content on the proximate wireless-enabled interactive programmable device 32.

With respect to amenity control, the memory 142 includes processor-executable instructions that, when executed cause the processor to be responsive to evaluating the spoken sequence of words, send a command to the particular amenity. A configuration profile is associated with the memory 142 and processor-executable instructions that enables the set-top box 12 to control multiple proximate amenities related to a user's stay in a lodging establishment in a multi-room environment, including the particular amenity to be controlled. The configuration profile, for each amenity of the plurality of amenities, includes instructions for virtual buttons on a touch screen display, and instructions for associating virtual remote control functionality input instructions from the touch screen display with commands. The configuration profile, for each amenity of the plurality of amenities, includes instructions for virtual buttons on a touch screen display, and instructions for associating virtual remote control functionality input instructions received as the spoken sequence of words from the proximate wireless-enabled interactive programmable device with commands.

Figure 5:
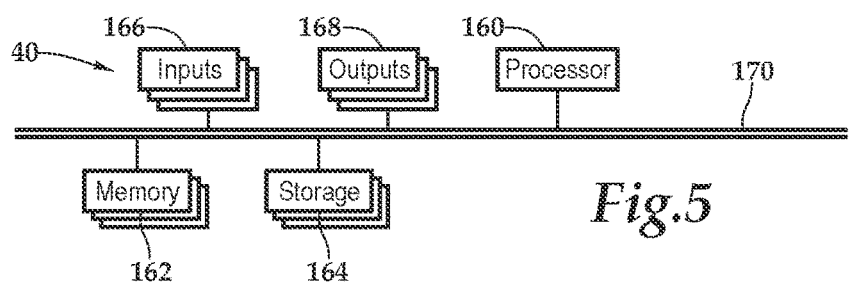
FIG. 5 is a functional block diagram depicting one embodiment of a server presented in FIGS. 2A and 2B.

Referring now to FIG. 5, one embodiment of the server 40 as a computing device includes a processor 160, memory 162, storage 164, inputs 166, and outputs 168 interconnected with various buses 170 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 160 may process instructions for execution within the server 40, including instructions stored in the memory 162 or in storage 164. The memory 162 stores information within the computing device. In one implementation, the memory 162 is a volatile memory unit or units. In another implementation, the memory 162 is a non-volatile memory unit or units. Storage 164 includes capacity that is capable of providing mass storage for the server 40. Various inputs 166 and outputs 168 provide connections to and from the server 40, wherein the inputs 166 are the signals or data received by the server 40, and the outputs 168 are the signals or data sent from the server 40.

The memory 162 is accessible to the processor 160 and includes processor-executable instructions that, when executed, cause the processor 160 to execute a series of operations. The processor-executable instructions cause the processor to update periodically or on-demand, depending on the operational configuration, a database or update portion thereof, with current group identification to one or more of the set-top boxes directly or through a property headend.

The group identification relates to a hospitality aspect such as group travel relative to the hospitality establishment, group meeting accommodations relative to the hospitality establishment, group event accommodations relative to the hospitality establishment, and the like. The group identification associated with a proximate wireless-enabled programmable device carried by an individual guest may be stored in the set-top box or accessible by a server. In one embodiment, individual guest settings, including group identification, are stored in a database of guest settings indexed by a master index record that could be either the guest's loyalty program membership identifier or a separate identifier such as the guests email address. In some situations, a hotelier may choose to use their own system to maintain these records while other hoteliers may choose to use a database system provided by an external service.

Thus, the systems and methods disclosed herein enable displays in common areas of lodging establishments to provide customized content to guests and visitors. Further, the systems and methods disclosed herein may enable users to use existing electronic devices as a temporary remote control device to control a display or television in a common area via a set-top box. Therefore, the systems and methods presented herein avoid the need for additional or expensive high functionality remote controls. In this respect, the teachings presented herein also include providing the software and/or application for the electronic device or interactive handheld device. The application, to the extent needed, may be downloaded from the Internet or alternatively made available by download from the set-top box.

Figure 6:
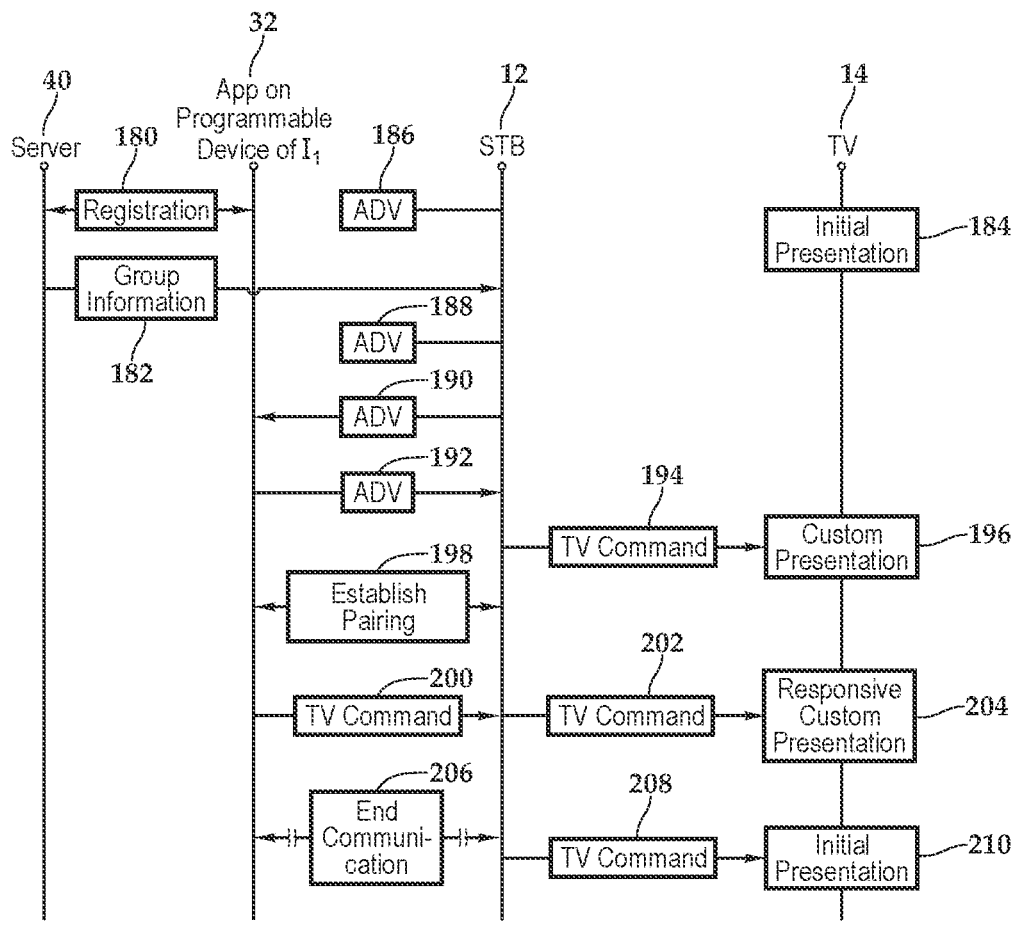
FIG. 6 is a signalization timing depicting one embodiment of an operational process furnishing enhanced content according to the teachings presented herein.

Referring now to FIG. 6, wherein signalization timing between the server 40, an application on the proximate wireless-enabled interactive programmable device 32, the set-top box 12, and the display located in a common space is depicted. As previously mentioned, individuals may be associated with particular groups at the time of room reservation, event reservation, room check-in or event check-in, for example, with an individual's proximate wireless-enabled programmable device being associated with the individual at the same time, for example. At signaling block 180, in one embodiment, an individual $I_1$ checks-in to the hotel associated with the server 40. At this time, the individual's proximate wireless-enabled interactive programmable device 32 is associated with the individual $I_1$ and the individual's group information is determined by the server 40. Additionally, at this moment or before, the application may be installed on the individual's proximate wireless-enabled programmable device. It should be appreciated, however, that the installation of the application is exemplary and not necessary to the practice of the teachings presented herein.

At signaling block 182, the group information is transmitted from the server 40 to the set-top box 12. The transmission may be part of a regular update sent to the set-top box 12 from the server 40 or prompted by an event, such as the check-in of the individual $I_1$. At signaling block 184, the display 14 is showing an initial presentation 184 in the common space. The initial presentation 184 may include information that is generic to the guests in the hotel and not specific for any one group. At signaling blocks 186 and 188, the set-top box 12, which in one embodiment is co-located with the display 14, transmits advertising broadcast data to identify any proximate wireless-enabled programmable devices near the set-top box 12 and the display 14. At this time, the individual $I_1$ and the proximate wireless-enabled interactive programmable device 32 are not near the common space wherein the set-top box 12 and the display 14 are located.

At signaling block 190, the set-top box 12 transmits further advertising broadcast data to identify any proximate wireless-enabled programmable devices nearby. The individual $I_1$ and the proximate wireless-enabled interactive programmable device 32 are now near the common space wherein the set-top box 12 and the display 14 are located. The advertising broadcast data is received by the proximate wireless-enabled interactive programmable device 32 and the proximate wireless-enabled interactive programmable device 32 responds with advertising broadcast data at signaling block 192. The set-top box 12 then identifies the group associated with the individual $I_1$ based on the previously provided group information at previous signaling block 182. Once the group identification is made, then the set-top box 12 sends a command at signaling block 194 to provide custom content and a custom presentation on the display 14, as shown by signaling block 196. The custom presentation may include information particularly relevant to the group that the individual $I_1$ belongs.

At signaling block 198, with the use of the application installed on the proximate wireless-enabled interactive programmable device 32, a pairing is established between the proximate wireless-enabled interactive programmable device 32 and the set-top box 12. Based on this pairing, the proximate wireless-enabled programmable device may control and interact with the set-top box 12 and the display 14. At signaling block 200, the proximate wireless-enabled programmable device acts as a remote control and sends a command to the set-top box 12 to obtain make a selection on the custom presentation on the display 14. This command is received by the set-top box 12 and the set-top box 12 sends a new custom presentation representing the processing of the command to the display as shown by signaling block 202. The new responsive custom presentation is shown on the display 14 as shown by signaling block 204. The custom information requested may be, for example, additional information about an event or a map relative to an event that is associated with the group that the individual $I_1$ belongs.

Following this interaction with the proximate wireless-enabled interactive programmable device 32 and the set-top box 12 and display 14, the individual walks away from the common space wherein the set-top box 12 and the display 14 are located. As shown by the signaling block 206, this causes the communication between the proximate wireless-enabled interactive programmable device 32 and the set-top box 12 to end. Further, the proximate wireless-enabled interactive programmable device 32 is out-of-range of receipt or transmission of advertising broadcast data with the set-top box 12. As a result, the set-top box 12 sends a command, which may include content, to the television at signaling block 208 to return to the general information as shown by the signaling block 210.

Figure 7:
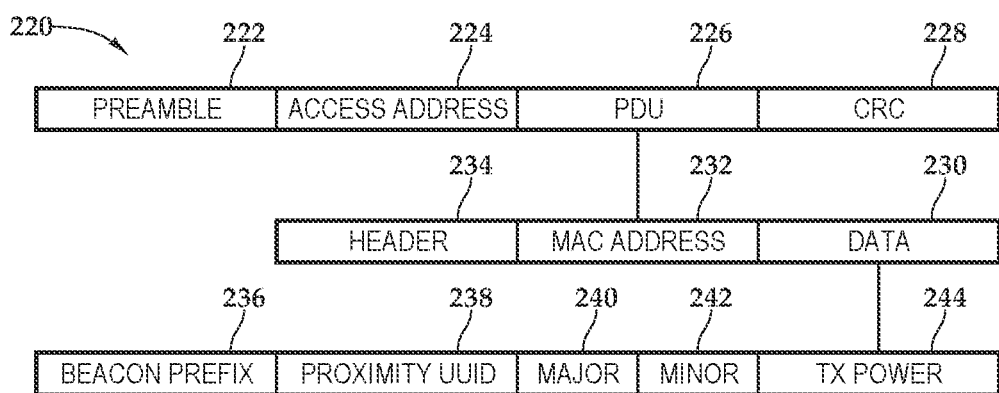
FIG. 7 is a packet diagram depicting one embodiment of packet break down utilized in the signalization timing presented in FIG. 6.

Referring now to FIG. 7, the advertising broadcast data may include a packet 220 that may utilize Bluetooth Low Energy (BLE) that provides for an exchange of data via a connected mode and an advertising mode. The connected mode may utilize a communication layer, such as the Generic Attribute (GATT) layer, to transfer data in a one-to-one connection. On the other hand, the advertising mode may use a layer, such as the Generic Access Profile (GAP) layer, to broadcast data out to anyone listening. In one implementation, BLE beacons may utilize GAP advertising mode to broadcast data out in a periodic, specifically formatted advertising packets. In one embodiment, the packet 220 includes a preamble 222 utilized for internal protocol management, an access address 224 for addressing an advertising packet, a packet data unit (PDU) 226, and a Cyclical Redundancy Check (CRC) 228. As shown, the PDU 226 may include a header 234, a MAC address 232 for identification, and data 230, which includes the payload. In one implementation, the data 230 includes a beacon prefix 236, a proximity Universally Unique Identifier (UUID) 238, a major number 240, a minor number 242, and transmission (TX) power level 244.

In one embodiment, the packet 220 acts as a beacon that may broadcast information including a proximity UUID 238 that identifies the beacon, the major number 240 identifying a subset of beacons within a large group, the minor number 242 identifying a specific location, and the TX power level 244 indicating the signal strength. In one embodiment, the beacon may be broadcast from a proximate wireless-enabled programmable device in response to a communication or of its own initiative, and a scanning application with the set-top box, may read the proximity UUID 238, the major number 240, and the minor number 242 and then reference the proximity UUID 238, the major number 240, and the minor number 242 against at database to obtain information about the beacon as the beacon itself may carry no descriptive information. The TX power field 244 is utilized with the measured signal strength to determine how far away the beacon is from the set-top box. The proximity UUID 238 may be standard BLE UUID and the major and minor numbers 240, 242 may denote assets within the standard BLE UUID. By accessing the database, the set-top box 12 determines the identity of the proximate wireless-enabled programmable device and the group identification associated with the proximate wireless-enabled programmable device.

Figure 8:
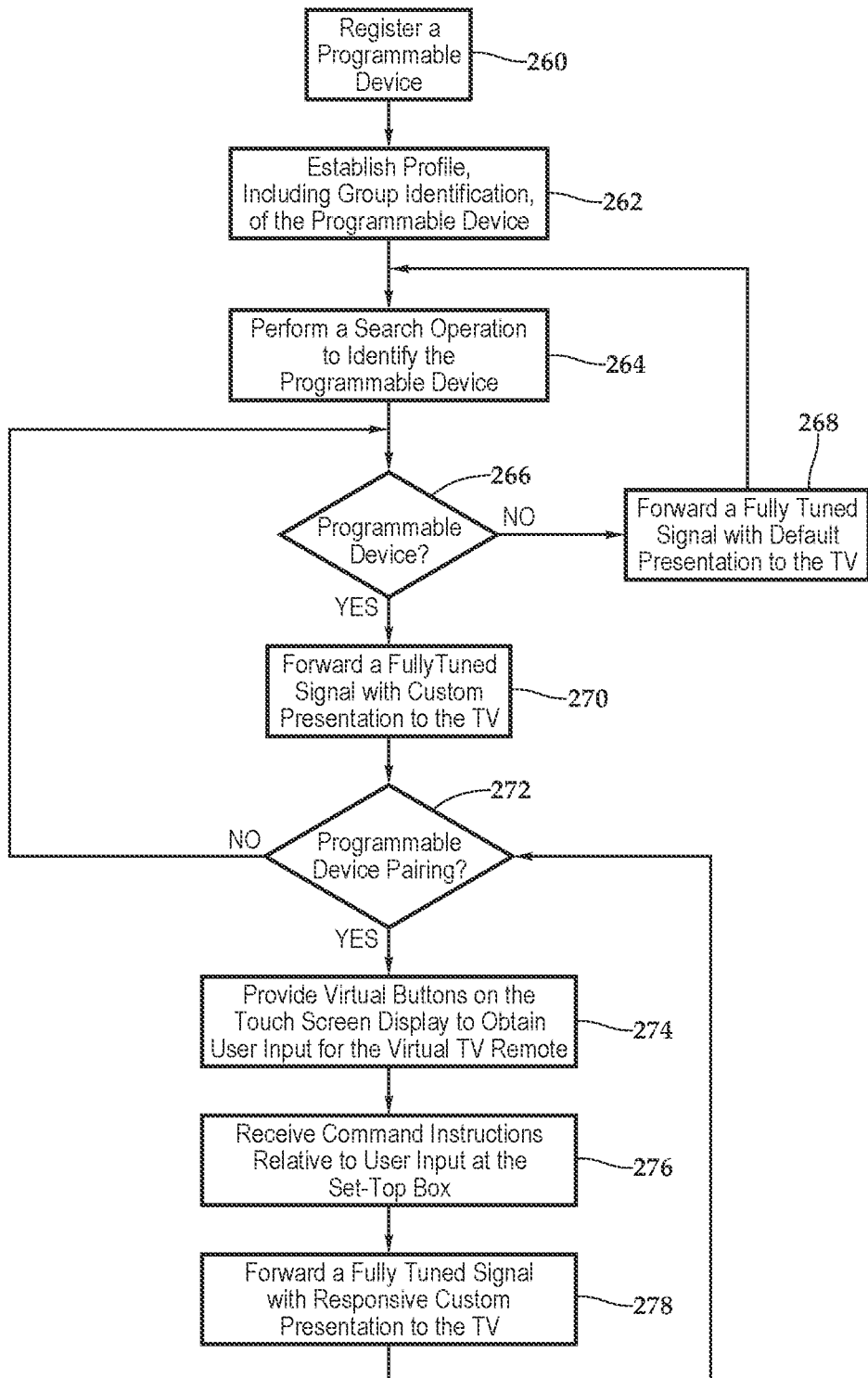
FIG. 8 is a flow chart depicting one embodiment of a method for providing a set-top box having enhanced content thereon according to the teachings presented herein.

FIG. 8 depicts one embodiment of a method for providing enhanced content, according to the teachings presented herein. At block 260, the proximate wireless-enabled programmable device is registered. In one implementation, this may involve using an existing application on the proximate wireless-enabled programmable device, such as a browser, or downloading a new application. As mentioned, the registration may occur at the time of room reservation, event reservation, room check-in or event check-in, for example with an individual's proximate wireless-enabled programmable device being associated with the individual at the same time, for example. At block 262, the profile, including group identification, is established for the proximate wireless-enabled programmable device.

At block 264, a search, which may be active or passive, is performed by the set-top box to identify a physically proximate programmable device in the common area within the multi-room environment. At decision block 266, if a programmable device is not found, then at block 268, a fully tuned signal with a general content provides a default presentation to the display, which may be a television. The methodology then returns to block 264. Returning to decision block 266, if a programmable device is located, then at block 270, a fully tuned signal with custom content and a customized presentation is forwarded to the display.

At decision block 272, if the proximate wireless-enabled programmable device doesn't want a pairing, then the methodology returns to decision block 266. On the other hand, if the proximate wireless-enabled programmable device initiates a pairing, by way of an application or pre-setting, for example, then the methodology advances to block 274. At block 274, with respect to remote control of the television, instructions are provided from the set-top box for virtual buttons on a touch screen display associated with the proximate wireless-enabled interactive programmable device. The virtual buttons are associated with the proximate wireless-enabled interactive programmable device and relate to obtaining user input for the virtual TV remote control functionality provided by the set-top box. At block 276, the set-top box receives and processes virtual remote control functionality input instructions from the proximate wireless-enabled interactive programmable device that are relative to user input. At block 278, the command is executed and a fully tuned signal that is responsive to the command is generated and sent to the display or television as a responsive custom presentation. The methodology then returns to decision block 272.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
   a housing securing an input, an output, a processor, memory, and storage therein;
   a busing architecture communicatively interconnecting the input, the output, the processor, the memory, and the storage;
   a wireless transceiver associated with the housing and coupled to the busing architecture, the wireless transceiver operable to communicate with a proximate wireless-enabled interactive programmable device;
   the input configured to receive a source signal from an external source;
   the output configured to forward a fully tuned signal to a display;
   the memory accessible to the processor, the memory including processor-executable instructions that, when executed, cause the processor to:
      forward the fully tuned signal to the display, the fully tuned signal including general content,
      specify a search operation to identify the proximate wireless-enabled interactive programmable device, wherein the search operation utilizes the wireless transceiver to wirelessly identify the proximate wireless-enabled interactive programmable device,
      responsive to identifying the proximate wireless-enabled interactive programmable device, forward the fully tuned signal to the display, the fully tuned signal including custom content relative to a group identification associated with the proximate wireless-enabled interactive programmable device,
      establish a pairing between the proximate wireless-enabled interactive programmable device and the set-top box, provide instructions for virtual buttons on a touch screen display associated with the proximate wireless-enabled interactive programmable device, the virtual buttons being associated with the proximate wireless-enabled interactive programmable device, receive and process virtual remote control functionality input instructions from the proximate wireless-enabled interactive programmable device, evaluate the functionality input instructions to assign a meaning, generate a command signal, and send the command signal to the display;

the general content and custom content relate to a hospitality establishment; and the group identification relates to a hospitality aspect selected from the group consisting of group travel relative to the hospitality establishment, group meeting accommodations relative to the hospitality establishment, and group event accommodations relative to the hospitality establishment.

2. The set-top box as recited in claim 1, wherein the display further comprises a device selected from the group consisting of electronic visual display devices and televisions.

3. The set-top box as recited in claim 1, wherein the hospitality establishment is selected from the group consisting of furnished multi-family residences, dormitories, lodging establishments, hotels, hospitals, and multi-unit environments.

4. The set-top box as recited in claim 1, wherein the processor-executable instructions that, when executed, cause the processor to specify a search operation to identify the proximate wireless-enabled interactive programmable device further comprise processor-executable instructions that, when executed, cause the processor to transmit advertising broadcast data via the wireless transceiver.

5. The set-top box as recited in claim 4, wherein the processor-executable instructions that, when executed, cause the processor to specify a search operation to identify the proximate wireless-enabled interactive programmable device further comprise processor-executable instructions that, when executed, cause the processor to receive via the wireless transceiver response data from the proximate wireless-enabled interactive programmable device responsive to the transmission of advertising broadcast data via the wireless transceiver.

6. The set-top box as recited in claim 1, wherein the processor-executable instructions that, when executed, cause the processor to specify a search operation to identify the proximate wireless-enabled interactive programmable device further comprise processor-executable instructions that, when executed, cause the processor to receive via the wireless transceiver advertising broadcast data from the proximate wireless-enabled interactive programmable device.

7. The set-top box as recited in claim 1, wherein the processor-executable instructions that, when executed, cause the processor to specify a search operation to identify the proximate wireless-enabled interactive programmable device utilizing Bluetooth low energy data exchange.

8. The set-top box as recited in claim 1, wherein the processor-executable instructions that, when executed, cause the processor to specify a search operation to identify the proximate wireless-enabled interactive programmable device utilizing Bluetooth low energy beacons.

9. The set-top box as recited in claim 1, wherein the housing further comprises a housing-dongle combination securing the television input, the television output, the processor, memory, storage, and wireless transceiver therewith.

10. The set-top box as recited in claim 9, wherein the processor and the memory are distributed through the housing-dongle combination.

11. The set-top box as recited in claim 1, wherein the wireless transceiver is configured to communicate with the proximate wireless-enabled interactive programmable device via a standard selected from the group consisting of infrared (IR), 802.11, 3G, 4G, Edge, Wi-Fi, ZigBee, near field communications (NFC), Bluetooth, and Bluetooth low energy.

12. The set-top box as recited in claim 1, wherein the wireless transceiver is configured to communicate with the proximate wireless-enabled interactive programmable device via a short distance data exchange standard.

13. The set-top box as recited in claim 12, wherein the short distance data exchange standard comprises Bluetooth low energy.

14. The set-top box as recited in claim 1, wherein the proximate wireless-enabled interactive programmable device comprises a device selected from the group consisting of personal computers, laptops, tablet computers, smart phones, and smart watches.

15. The set-top box as recited in claim 1, wherein the display further comprises a device selected from the group consisting of electronic visual display devices and televisions.

16. The set-top box as recited in claim 1, wherein the hospitality establishment is selected from the group consisting of furnished multi-family residences, dormitories, lodging establishments, hotels, hospitals, and multi-unit environments.

17. The set-top box as recited in claim 1, wherein the proximate wireless-enabled interactive programmable device comprises a device selected from the group consisting of personal computers, laptops, tablet computers, smart phones, and smart watches.

18. A set-top box comprising:

a housing securing an input, an output, a processor, memory, and storage therein;

a busing architecture communicatively interconnecting the input, the output, the processor, the memory, and the storage;

a wireless transceiver associated with the housing and coupled to the busing architecture, the wireless transceiver operable to communicate with a proximate wireless-enabled interactive programmable device;

the input configured to receive a source signal from an external source;

the output configured to forward a fully tuned signal to a display; and the memory accessible to the processor, the memory including processor-executable instructions that, when executed, cause the processor to:

forward the fully tuned signal to the display, the fully tuned signal including general content, specify a search operation to identify the proximate wireless-enabled interactive programmable device by transmitting advertising broadcast data via the wireless transceiver using a Bluetooth low energy standard, wherein the search operation utilizes the wireless transceiver to wirelessly identify the proximate wireless-enabled interactive programmable device, responsive to identifying the proximate wireless-enabled interactive programmable device, forward the fully tuned signal to the display, the fully tuned signal including custom content relative to a group identification associated with the proximate wireless-enabled interactive programmable device, establish a pairing between the proximate wireless-enabled interactive programmable device and the set-top box, provide instructions for virtual buttons on a touch screen display associated with the proximate wireless-enabled interactive programmable device, the virtual buttons being associated with the proximate wireless-enabled interactive programmable device, receive and process virtual remote control functionality input instructions from the proximate wireless-enabled interactive programmable device, evaluate the functionality input instructions to assign a meaning, generate a command signal, and send the command signal to the display;

the general content and custom content relate to a hospitality establishment; and the group identification relates to a hospitality aspect selected from the group consisting of group travel relative to the hospitality establishment, group meeting accommodations relative to the hospitality establishment, and group event accommodations relative to the hospitality establishment.

19. A set-top box comprising:

a housing securing an input, an output, a processor, memory, and storage therein;

a busing architecture communicatively interconnecting the input, the output, the processor, the memory, and the storage;

a wireless transceiver associated with the housing and coupled to the busing architecture, the wireless transceiver operable to communicate with a proximate wireless-enabled interactive programmable device;

the input configured to receive a source signal from an external source;

the output configured to forward a fully tuned signal to a display; and the memory accessible to the processor, the memory including processor-executable instructions that, when executed, cause the processor to:

forward the fully tuned signal to the display, the fully tuned signal including general content, specify a search operation to identify the proximate wireless-enabled interactive programmable device by receiving advertising broadcast data from the proximate wireless-enabled interactive programmable device via the wireless transceiver using a Bluetooth low energy standard, wherein the search operation utilizes the wireless transceiver to wirelessly identify the proximate wireless-enabled interactive programmable device, and responsive to identifying the proximate wireless-enabled interactive programmable device, forward the fully tuned signal to the display, the fully tuned signal including custom content relative to a group identification associated with the proximate wireless-enabled interactive programmable device, establish a pairing between the proximate wireless-enabled interactive programmable device and the set-top box, provide instructions for virtual buttons on a touch screen display associated with the proximate wireless-enabled interactive programmable device, the virtual buttons being associated with the proximate wireless-enabled interactive programmable device, receive and process virtual remote control functionality input instructions from the proximate wireless-enabled interactive programmable device, evaluate the functionality input instructions to assign a meaning, generate a command signal, and send the command signal to the display;

the general content and custom content relate to a hospitality establishment; and the group identification relates to a hospitality aspect selected from the group consisting of group travel relative to the hospitality establishment, group meeting accommodations relative to the hospitality establishment, and group event accommodations relative to the hospitality establishment.

* * * * *